June 1, 1954 C. K. RAINEY Re. 23,834

MARGINAL AND COLUMN STOP CONTROL MECHANISM
AND CORRELATED INDICATOR GUIDES
FOR IMPRINTING MACHINES

Original Filed Nov. 16, 1945 2 Sheets-Sheet 1

INVENTOR.
CLIFTON KING RAINEY.
BY Harry C. Lenter
ATTORNEY.

June 1, 1954 C. K. RAINEY Re. 23,834
MARGINAL AND COLUMN STOP CONTROL MECHANISM
AND CORRELATED INDICATOR GUIDES
FOR IMPRINTING MACHINES
Original Filed Nov. 16, 1945 2 Sheets-Sheet 2
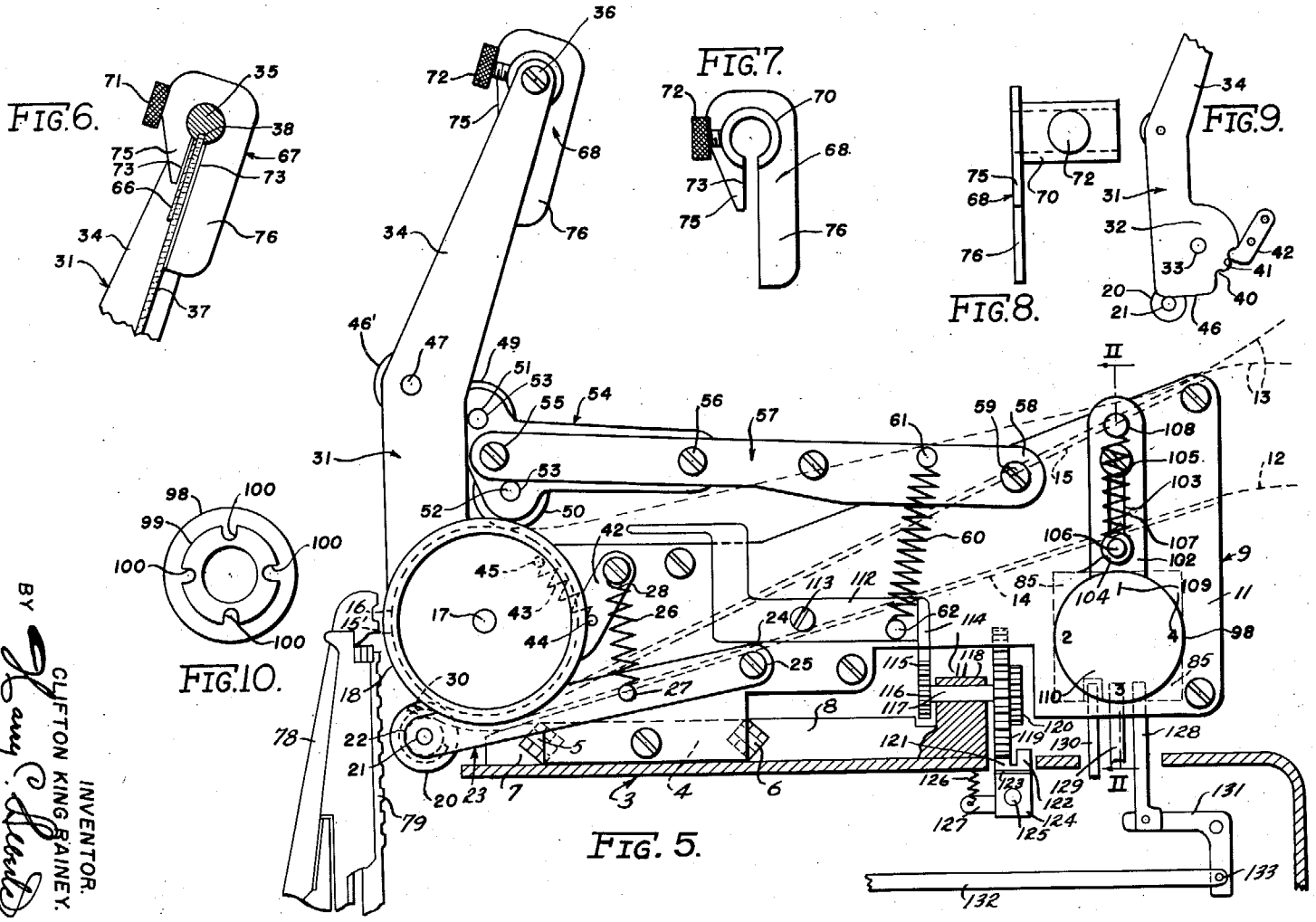
INVENTOR.
CLIFTON KING RAINEY.
BY Harry C. Lewis
ATTORNEY.

Reissued June 1, 1954

Re. 23,834

UNITED STATES PATENT OFFICE 23,834

MARGINAL AND COLUMN STOP CONTROL MECHANISM AND CORRELATED INDICATOR GUIDES FOR IMPRINTING MACHINES

Clifton King Rainey, Knoxville, Tenn., assignor, by mesne assignments, to Rainey Accounting Machine Company, Inc., Knoxville, Tenn., a corporation of Tennessee Original No. 2,492,887, dated December 27, 1949, Serial No. 629,184, November 16, 1945. Application for reissue December 26, 1950, Serial No. 202,610

13 Claims. (Cl. 197—70)

Matter enclosed in heavy brackets [ ] appears in the original patent but forms no part of this reissue specification; matter printed in italics indicates the additions made by reissue.

This invention relates to typing, printing and computing machines and more particularly to improved paper feeders therefor, although it may be employed with equal advantage for other purposes. This application is a continuation-in-part of my co-pending application Serial Number 580,117, filed February 28, 1945, *now Patent No. 2,598,939.*

It contemplates more especially the provision of a simplified, improved and more effective front feed carriage for machines of the character mentioned and more particularly for combined typewriting and accounting machines of simplified construction and improved operation.

Front feed carriages for typing, computing and accounting machines are common, but these are intricate, involve many parts, and for practical and commercial reasons are applicable for the most part to elaborate accounting and similar devices. In machines involving plural sheets for recording impressions and computations of mechanical devices, the front feed carriage is very suitable and usually deemed best from a time and labor saving standpoint, intricacy, maintenance and expense being secondary to the results sought. With the teachings of the present invention plural independent sheets are capable of front feed response without involving substantially more than the standard back-feed devices from a structural and production cost standpoint.

One object of the present invention is to improve the construction and operation of devices of the character mentioned.

Another object is to provide an improved and simplified front feed carriage for typing, printing, computing machines, and the like.

Still another object is to provide an improved manual front feed carriage for machines of the character mentioned.

A further object is to provide an improved roller friction paper feed for machines of the character mentioned.

A still further object is to provide an improved multiple control stop bar to vary the functions of the machine to which it is applied.

Still a further object is to provide improved paper marginal indexing and functioning means in conjunction with a multiple control stop bar.

Other objects and advantages will appear from the following description of an illustrated embodiment of the present invention.

In the drawings:

Figure 5 is a fragmentary side view in elevation of the carriage and its associated elements illustrated in Figure 1.

Figure 6 is a fragmentary sectional view in elevation of the stop indexing sight taken substantially along line VI—VI of Figure 1.

Figure 7 is a fragmentary detail side view in elevation of the indexing sight stop shown in Figure 6.

Figure 8 is a detail plan view of the indexing sight stop shown in Figure 7.

Figure 9 is a fragmentary side view in elevation of a front feed frame lever showing the lower end portion thereof.

Figure 10 is a sectional view in elevation of the multiple stop control indexing collar taken substantially along line X—X of Figure 2.

Figure 1:
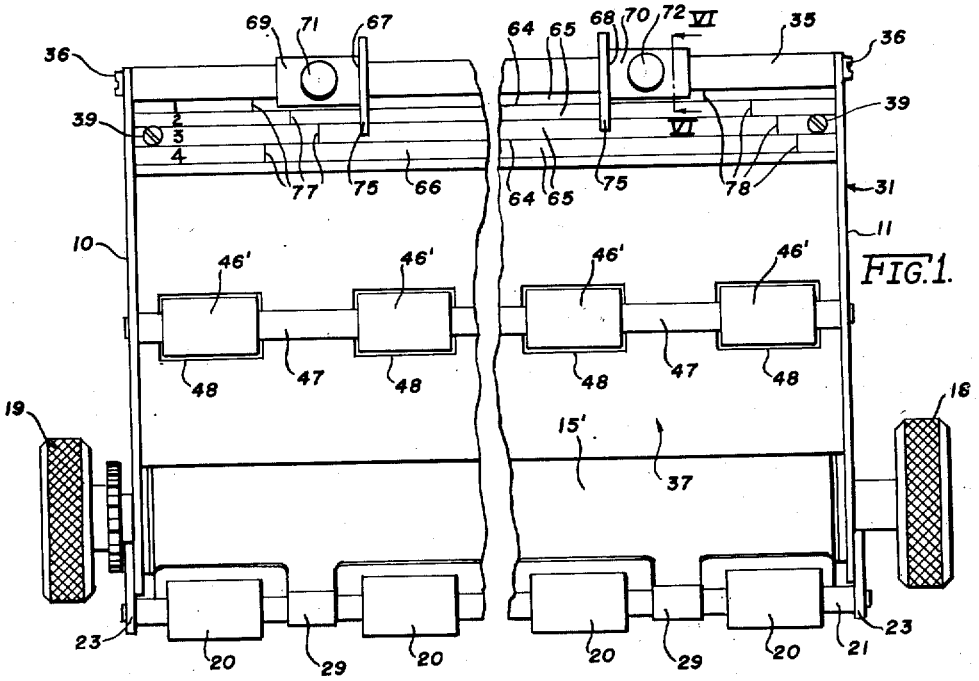
Figure 1 is a fragmentary front view in elevation of a front feed carriage for typing and accounting machines embodying features of the present invention.

The structure selected for illustration is not intended to serve as a limitation upon the scope or teachings of the invention, but is merely illustrative thereof. There may be considerable variations and adaptations of all or part of the teachings depending upon the dictates of commercial practice. The present embodiment comprises instrumentalities mounted on a machine frame 3 having a cast or otherwise shaped bearing plate 4 (Figure 5) for cooperation through suitable ball or roller bearings 5 and 6 with carriage rails 7 and 8 to movably support a carriage 9 which includes parallel side plates 10—11.

The carriage 9 is provided with upstanding side plates 10—11 for supporting the instrumentalities which are required to secure, feed, and print plural sheets of paper according to the purpose or purposes for which the mechanism and instrumentalities have been designed, assembled and integrated irrespective of the particular term or terms that may be utilized to identify the machine or mechanism for illustrative purposes. In the present embodiment, plural sheets such as a ledger sheet 12 and a journal sheet 13 (Figure 5) are supported and guided on inclined chute plates 14 and 15, respectively, which extend between the carriage side plates 10—11, and converge downwardly toward a platen 15 having the usual rubber friction tubular sleeve 16 thereon. The platen 15 is supported by an axial rod 17 which is journaled in the carriage side plates 10—11. Platen knobs 18—19 are fixed to the extremities of the rod 17 (Figure 1) to afford manual rotation of the platen 15.

The plural sheet front feeding mechanism cooperates with the platen 15 which has constant frictional contact with a series of lower rubber covered feed rolls 20 mounted in spaced relation on a rod 21 which is journaled in the extremities 22 of levers 23 (Figure 5). The levers 23 are pivoted at their other extremities 24 to screw pins 25 anchored in the carriage side plates 10—11. A coil spring 26 is anchored at one end as at 27 to each of the levers 23 while the other ends thereof are anchored at 28 to the carriage side plates 10—11 to normally urge the feed rolls 21 upwardly in a clockwise direction (viewed from Figure 5) against the rubber platen surface 16 so that the plural sheets 12—13 which may consist of any number of different forms, will be frictionally engaged therebetween. For instance, a statement form will usually overlie the ledger sheet 12 with a carbon sheet therebetween, and similarly other sheets may be superposed therewith and also with the journal sheet 13. For that matter, additional chute plates may be arranged between either or both sides of the chute plates 14—15 should commercial practice so dictate.

The lower chute plate 14 extends to and around the lower feed roll rod 21. To this end the chute plate 14 terminates in spaced curved rod engaging end loops 29 (Figure 1) which are interposed between the spaced lower feed rolls 20 to alternate therewith so that the ledger, journal and any other sheets superposed thereon will be guided between the platen surface 16 and the surfaces of the lower feed rollers 20 (Figure 5). The chute plate 14 has upwardly curved extensions 30 (Figure 5), which alternate with the rod engaging end loops 29, and these conform in curvature with the platen surface 16 to guide the ledger sheets 12 around the platen 16 and upwardly as will appear more fully hereinafter. The upper chute plate 15 terminates at the lower edge line of the carriage side plates 10—11 (Figure 5) to direct the journal sheet 13 and any other sheets superposed therewith between the surfaces of the platen 16 and feed rollers 20 with the ledger sheet 12 and its associated sheets below the journal sheet 13 and any sheets associated therewith, all of these passing between the platen 16 and feed rollers 20 which are in frictional contact therewith.

The plural sheets 12—13 are progressively fed by the platen 16 which is manually rotated by the platen rod 17 having knobs 18—19 thereon for that purpose. The platen mechanism 15—16—17 not only cooperates with the lower feed rolls 20 which bind all the plural sheets 12—13 therebetween, but also cooperates with a front feed frame 31 consisting, in this instance, of confronting platen rod hub plates 32 (Figure 9) which are eccentrically bored as at 33 for journaled connection with the platen rod 17. The front feed frame plates 31 have angularly offset levers 34 extending therefrom to project upwardly. The front feed frame levers 34 are maintained in rigid spaced relation by a crossbar 35 (Figures 1 and 6) having axially extending threaded mounting screws 36 for connection with the upward extremities of the levers 34. A transparent visor and guide plate 37 of plastic or other suitable material extends between the levers 34 for attachment thereto and within a linear groove 38 extending along the top cross-bar 35 by means of suitable fasteners such as the machine screws 39 (Figure 1).

The top cross-bar 35 also serves as a manual grasping element to displace the front feed frame 31 about the platen rod 17 to open and close the front feed frame as will appear more fully hereinafter. The open and closed positions of the front feed frame 31 are indexed by means of spaced notches 40—41, in this instance two, on the peripheral edge of the front feed frame mounting hub plates 32 (Figure 9) comprising, in this instance, an integral part of the levers 31. The notches 40—41 on each of the hub plates 32 cooperate with a pawl 42 pivoted to each of the spring anchor screws 28 carried by the carriage side plates 10—11. A coil spring 43 is connected to the pawl 42 as at 44 while its other end is anchored as at 45 to the carriage side plates 10—11 (Figure 5) to normally urge the pawls 42 into engagement with the notches 40 or 41 to maintain the front feed frame 34 in its closed or open position.

The front feed frame hub plates 32 each have a camming edge 46 of increasing radius in a clockwise direction (viewed from Figure 9) to cooperate with the lower feed roll rod or shaft 21 so that the feed rolls 20 will be displaced from contact with the platen surface 16 when the front feed frame 31 has been displaced in a counterclockwise direction (viewed from Figure 5) to assume its open or disengaged relation with the platen surface 16 or the plural sheets 12—13 disposed between rollers 16—20. This is effected against the urge of the spring 26 (Figure 5) and this open position is maintained by the pawl 42 which meshes with the hub plate notches 40—41 (Figure 9). The plural sheets 12—13 may be manually displaced along the chute plates 14—15 when the front feed frame 31 is in its inoperative open position in that the lower feed rolls 20 which normally hold the plural sheets against the platen 15, are removed therefrom and permit free displacement of the plural sheets 12—13 without rotating or turning the platen 15.

In the closed position of the front feed frame 31 when it is in its extreme clockwise position (viewed from Figure 5), the pawls 42 register with the notch 41 on each of the hub plates 32 and the lower feed roller rod 21 recedes along the cam edges 46 to permit the springs 26 to raise the lower feed rolls 20 to either contact the platen surface 16 or the plural form sheets 12—13 therebetween. In this position, front feed ledger sheet rolls 46 mounted on a rod 47 carried between the front feed frame levers 34 to project through the visor cutouts 48 (Figure 1) operatively engage feed rollers 49 either directly or through the upturned ledger sheet 12.

As shown, the feed rollers 49—50 are in linear alignment for mounting on shafts 51—52 which have reduced extremities for registry with apertures 53 provided in the substantially T-shaped end bracket plates 54 attached as at 55—56 by means of machine screws or other fasteners to supporting bails 57 (Figure 5). The elongated feed roll bails 57 are pivoted at their extremities 58 to the carriage side plates 10—11 by means of pivot screws 59. Coil springs 60 connected as at 61 to the feed roll bails 57 and anchored as at 62 to the carriage side plates 10—11, supplement the urge of gravity in normally displacing the feed roll bails 57 in a counter-clockwise direction (viewed from Figure 5) to maintain frictional contact between the rolls 50 and the platen surface 16 or with the journal and its associated sheet 13 turned backwardly around the platen 15, and beneath the rolls 50 (Figure 5).

The rolls 49 are normally in frictional contact, and establish friction driving contact with the front feed frame upper rollers 46 when the frame levers 31 are displaced to and retained in their extreme clockwise position (Figure 5) with the lower rollers 50 in frictional contact with the platen surface 16 or the sheet 13 disposed therebetween. It is to be noted that the plural sheets 12—13 will be held and displaced between the rolls 46—49 and 16—50 which are all rotated in unison with the lower feed rolls 20 responsive to the spacing or manual rotation of the platen 15. It will thus be apparent that the mere shifting of the front feed frame 31 to its extreme clockwise position (viewed from Figure 5) will bring all the feed rolls into operative frictional contact to feed the plural sheets 12—13 from their chutes 14—15 around the platen surface 16, and between the rollers 46—49 and 16—50. This is accomplished with extreme simplicity of structure and operation.

One or more fine visible spaced parallel hairlines 64, in this instance defining four horizontal spaces 65, are etched in the plastic or other transparent visor 37 (Figure 1) to provide for the different sheet indexing preparatory to posting and insure the proper alignment of the plural sheets 12—13 in the carriage frame 10—11. For illustrative purposes, the horizontal spaces 65 inscribed upon a paper sheet 66 attached by fasteners 39 to the visor 37 near the top crossbar, enable the operator to set the forms 12—14 in the proper position for the applicable posting column. To this end, a pair of guides 67—68 having laterally extending tubular shanks 69—70, respectively, are slidably mounted on the rod 35 for adjustable connection therewith by means of threaded studs 71—72 which extend through the shanks 69—70 to engage the rod 35. The tubular shanks 69—70 and the guide plates 67—68 are split as at 73—74 to receive the top portion of the visor 37 and the replaceable indexing sheet 66 therebetween. The guide plates 67—68 each have a short upper lip 75 and a longer lower lip 76 which extend along both sides of the longitudinal visor 37 and sheet 66 receiving slits 73—74 therein. This enables the guide plates or strips 67—68 to be positioned in alignment with the markings on the indexing sheet 66 for the various posting operations for which the sheet 66 is calibrated or designated.

When the feed frame is in its closed position, the plural form sheets 12—13 will be held by the feed rolls 16—20, 46—49, and 50—16 both below and above the platen 15. In this closed operative position of the front feed frame 31, the visor or window 37 will move upward out of the path of the pivotal typewriter print bars 78 and the vertical reciprocal posting bars 79, the former being manual key-operated and the latter actuated by the motor bar (not shown). The form sheets 12—13 are inserted after the guide plates or strips 67—68 are set to conform with the marginal marking lines 77—78 provided in each horizontal sheet identifying space 65 (Figure 1). This affords the rapid changeover in posting operations for accounts receivable, accounts payable, sales distribution, payroll and other accounting machine posting operations as commercial practice may dictate.

Figure 2:
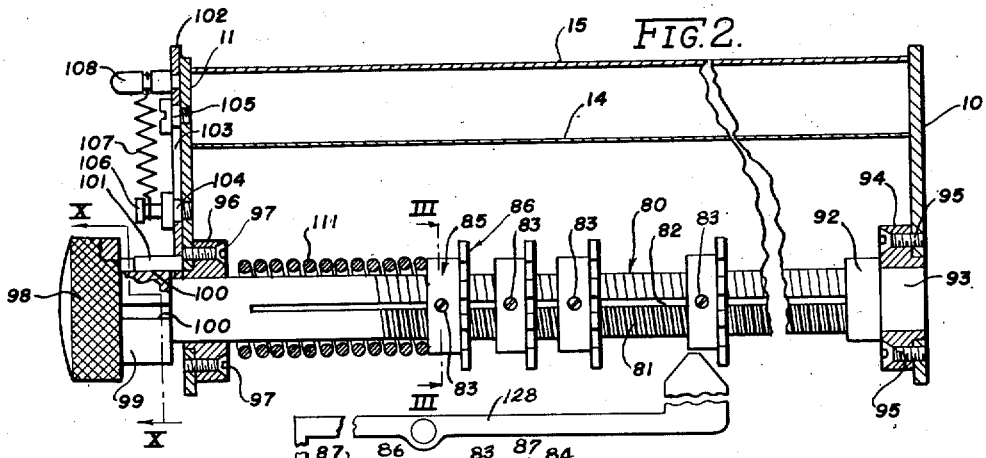
Figure 2 is a fragmentary sectional view in elevation taken substantially along broken line II—II of Figure 5 with parts of the multiple stop bar broken away to clarify the showing.
Figure 3:
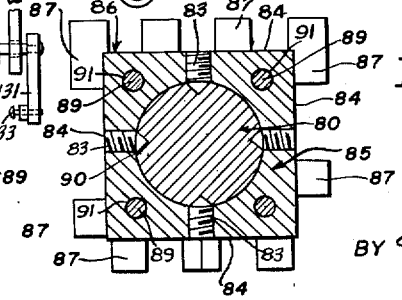
Figure 3 is a fragmentary enlarged sectional view in elevation of the multiple stop bar taken substantially along line III—III of Figure 2.
Figure 4:
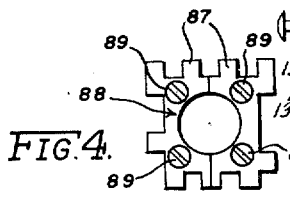
Figure 4 is a detail sectional side view in elevation of a sectional stop plate utilized in conjunction with the stop bar shown in Figures 2 and 3.

In order to expeditiously control the operating characteristics and function of the instrumentalities comprising any particular combination of elements, a multiple control bar 80 (Figure 2) is provided on the carriage between the plates 10—11. In the present embodiment, the control bar 80 is threaded as at 81 throughout the length thereof to provide, in this instance, twenty threads to the inch. A longitudinal groove 82 extends for substantially the length of the control bar 80 to cooperate with the set screws 83 that project radially through the center of the sides 84, in this instance four, of a polygonal shoulder 85, in this instance square, comprising part of the carriage stops 86. The carriage stops 86 have a series of differently spaced and varying numbers of control stop lugs 87 extending from each of the four edges thereof to comprise part of a sectional plate 88 (Figure 4).

The sectional plates 88 consist, in this instance, of symmetrical bi-sections which are fitted to the polygonal shoulder 85 by means of machine screws 89. In consequence thereof, the control stops 87 will project from beyond the surface edges of the shoulders 85 to present control stop obstructions along all sides of the polygonal shoulders 85. The control stops 87 on each shoulder 85, are mounted on the carriage in the path of a frame mounted stop (not shown) to provide column stops dependent upon the rotary position of control bar 80 that may be indexed to assume one of four positions to perform different operations for a corresponding number of different sheets that may be inserted for displacement over the platen 15 for the desired posting operations. The rotary and longitudinal position of the control stops 86 on the control bar 80 is effected through the threaded engagement of the polygonal shoulders 85 therealong.

To this end, the polygonal shoulders 85 are provided with axial bores 90 which are threaded to correspond with the threads 81 on the control bar 80 so that each full rotation of the stop 86 thereon will effect their linear displacement of one-twentieth of an inch. Correspondingly, a quarter turn of the polygonal shoulder stops 85 will bring the next succeeding set screw 83 thereon in registry with the longitudinal groove 82. This quarter turn linearly displaces the shoulders 85 with their stops 86 one-eightieth of an inch. With this arrangement, a very fine and accurate adjustment can be effected to place the stops in their desired exact and precise position with the bi-sections 88 attached to the polygonal shoulders 85 in any one of four different positions with the machine screws 89 engaging correspondingly threaded apertures 91 extending laterally within the shoulders 85.

The control bar 80 is provided with a peripheral shoulder 92 proximate to one extremity 93 thereof for journalled support in a bearing 94 attached to the side plate 10 by means of a plurality of machine screws 95. The peripheral shoulder 92 abuts against the bearing 94 to rotatively support the control bar 80 at the extremity 93. The other frame plate 11 is provided with a confronting bearing 96 attached thereto by means of a plurality of fastener machine screws 97 for journal support of control bar 80 proximate to the other extremity thereof which receives a knurled hand manipulating knob 98 thereon for rotation therewith. The knob 98 has a peripheral reduced shoulder 99 adjacent to the exterior of the frame plate 11 to provide circumferentially spaced longitudinal grooves 100, in this instance four, equidistantly spaced to serve as an indexing means for the control bar 80. To this end, the knob 98 rotates with the control bar 80 in both directions when an indexing pin 101 is removed from the path of grooves 100 with which the pin 101 may selectively register. The pin 101 is fixed to a vertically extending plate 102 (Figures 2 and 5) that is provided with a longitudinal slot 103 having guide screws 104—105 threadedly anchored in the frame plate 11 (Figure 2) to serve as a vertical displacing guide for the plate 102 within the limits of the slot 103.

The guide pin 104 has an extension 106 thereon to receive one end of a compression spring 107 while the other end thereof is anchored to a pin 108 fixed to the upper end of the plate 102. As a result, the spring 107 will normally exert a downward pull on plate 102 to maintain the indexing pin 101 against the shoulder 99 of knob 98 for registry with one of the four longitudinal grooves 100 provided therein. This indexes the control bar 80 to a quarter of a turn as the indexing pin 101 is placed in registry with each successive groove 100. The position of the control bar 80 can be designated by numbers or other indicia 109 provided on the exterior end surface 110 of the knob 98 (Figure 5). These particular stop lugs 87 or their predetermined combination of lugs 87 may be placed for projection from particular sides of the stop shoulder 85 to column space the frame plates 10—11 with their chutes 14—15 and supporting a carriage for each type of operation corresponding with the descriptive index 66, column indicator lines 77—78 and sheet guides 67—68 set therewith for each posting operation imprinted on the sheet 66 viewable from the front.

As a result, the marginal stop marks 77—78 shown for each operation and the sheet margin guides 67—68 are adjusted thereto along the rod 35 to enable the sheets 12—13 to be placed in the proper position between the frame plates 10—11 and within the chutes 14—15 for displacement around the platen 15. It will be apparent, therefore, that the present calibrated marginal stop marks 77—78 for each of the operations imprinted on the indexing sheet 66 which is also indexed by numbers which will correspond with the numbers or indicia 109 inscribed on the control bar 80 will facilitate posting operations for any one of four or more accounting functions for which the machine is set or intended. The column stops are rendered effective by a marginal or column control key comprising a part of the keyboard so that the carriage can be laterally shifted either manually or automatically responsive to the operation of the instrumentalities which are set in motion for each cycle by a standard electric motor (not shown) designed for that purpose.

In order to cushion the stop of the carriage for each column position, a comparatively heavy spring 111 envelops the control bar 80 (Figure 2) between the bearing 96 and the first stop 86 to yieldingly stop the carriage at each successive column. To this end, the control bar 80 is rotatively journalled within and longitudinally displaceable in the bearing 96 within the limits permitted by the spring 111. With this arrangement, the control bar 80 can be fitted with the necessary stops 86 which are precisely set thereon to control the operating characteristics of the machine.

In short, the multiple control bar 80 permits the operator to quickly change the instrumentalities for posting and printing on different forms and to automatically control the functions in printing and posting on particular sets of plural forms sheets 12—13 which are chute guided to the front feed frame 34. Consequently, the instrumentalities are rendered very flexible for enabling the efficient use thereof for accounts receivable ledger, statements and journal posting; for accounts payable ledger, remittance advice and journal; general ledger accounts and payroll; and employees ledger, checks and journals.

While the instrumentality operating mechanism forms no part of the present invention, there is shown for illustrative purposes standard carriage operating elements such as a carriage release lever 112 (Figure 5). The carriage release lever 112 is pivoted as at 113 to the carriage side plate 11 to present a rack bar 114 having a linear series of rack teeth 115 to mesh with a pinion 116. The pinion 116 is fixed to the extremity of a stud shaft 117 journaled in the upstanding shoulder 118 of a carriage rail 8 to rotatively support an escapement wheel 119 and a ratchet wheel 120. The escapement wheel 119 cooperates with spacing dogs 121—122 which are connected together by a pin 123. A shank 124 extends downwardly for support on a pivot 125 to oscillate the spaced dogs 121—122 so that one and then the other engages the escapement wheel 119. A spring 126 which extends downwardly from the carriage frame 3, is connected to an arm 127 offset from and fixed to the shank 125 to normally retain dog 121 in engagement with the escapement wheel 119.

While the stop lugs 87 are for illustrative purposes shown to be of uniform length and number on each control stop 85, these may be provided with one or more lugs 87 of varying lengths, shapes and with different contact surfaces to depress control and tabulating levers 128, 129 and 130 to cause the instrumentalities to add or subtract, print a date, tabulate to some other column, shift the instrumentalities from adding or subtracting to typing and vice-versa, non-add or non-print or to numerous other functions, both manual and automatic. The multiple control bar 80 permits the operator to quickly change the instrumentalities for posting and printing on different forms and to automatically control the functions in printing and posting that particular set of plural form sheets 12—13 which are chute guided to the front feed frame 31. Consequently, the instrumentalities are rendered very flexible for enabling the efficient use thereof for accounts receivable ledger, statements and journal posting; for accounts payable ledger, remittance advice and journal; general ledger accounts and payroll; and employees ledger, checks and journals.

The tabulating levers 128, 129, and 130 are manually operated through pivotal right angular crank arms 131 which have rods 132 pivoted thereto as at 133 (Figures 2 and 5) to provide for their actuation through the proper control buttons or keys on the keyboard of the machine (not shown). Consequently, means are provided for tying together or correlating the functions of the front feed paper guide stops 67—68 and the indicators 77—78 with the control bar 80 in such a manner as to make possible the use of a common horizontal tab or stop position for controlling the printing position of particular columns on different forms, even through the columns run the same distance from either the right or the left edge of one form as on any other form whereon different posting operations are to be imprinted. This arrangement enhances the flexibility of the machine operations without entailing any appreciable time for change-over from one type of posting to another, depending upon the particular operations that are required in maintaining a complete machine-posted set of books or accounting records.

The actuation of the spacer mechanism is well known on accounting and typewriter machines so that further explanation thereof would serve no useful purpose insofar as the present invention concerns itself with an improved front feed frame and a multiple control bar for facilitating the posting and printing on the plural form sheets 12—13 in connection with the front feed mechanism.

While I have illustrated and described a preferred embodiment of this invention, it must be understood that the invention is capable of considerable variation and modification without departing from the spirit of the invention. I, therefore, do not wish to be limited to the precise details of construction set forth, but desire to avail myself of such variations and modifications as come within the scope of the appended claims.

I claim:

1. In a device of the character described the combination with a frame, of a carriage on said frame, a platen carried by said carriage, feed rollers cooperating with said platen to support plural form sheets against said platen, a front feed frame operatively connected to said platen to assume an open and a closed paper feeding position relative thereto, *indicator* means on said front feed frame to indicate marginal positions for [particular] *different types of* sheets inserted to said front feed frame, *indicia on said front feed frame for designating the respective indicator means,* [and] a multiple control stop bar on said carriage adapted to be selectively set relative thereto, [to correspond with the marginal positions on said front frame indicator means] *and indicia on the multiple control bar for coordination with the indicia on the front feed frame for determining the settings of the multiple control bar for the different types of sheets inserted in said front feed frame.*

2. In a device of the character described the combination with a frame, of a carriage on said frame, a platen carried by said carriage, feed rollers cooperating with said platen to support plural form sheets against said platen, a front feed frame operatively connected to said platen to assume an open and a closed paper feeding position relative thereto, *indicator* means on said front feed frame to indicate marginal positions for [particular] *different types of* sheets inserted in said front feed frame, *indicia on said front feed frame for designating the respective indicator means,* guide stops adjustably mounted on said front feed frame for setting with said front feed frame indicator means, [and] a multiple control stop bar on said carriage adapted to be selectively set relative thereto, [to correspond with the marginal positions on said front feed frame indicator means] *and indicia on the multiple control bar for coordination with the indicia on the front feed frame for determining the settings of the multiple control bar for the different types of sheets inserted in said front feed frame.*

3. In a device of the character described the combination with a frame, of a carriage on said frame, a platen carried by said carriage, feed rollers cooperating with said platen to support plural form sheets against said platen, a front feed frame operatively connected to said platen to assume an open and a closed paper feeding position relative thereto, *indicator* means on said front feed frame to indicate marginal positions for [particular] *different types of* sheets inserted in said front feed frame, *indicia on said front feed frame for designating the respective indicator means,* [and] a multiple control stop bar rotatively mounted on said carriage adapted to be selectively set relative thereto, [to correspond with the marginal positions on said front feed frame indicator means] *and indicia on the multiple control bar for coordination with the indicia on the front feed frame for determining the settings of the multiple control bar for the different types of sheets inserted in said front feed frame.*

4. In a device of the character described the combination with a frame, of a carriage on said frame, a platen carried by said carriage, feed rollers cooperating with said platen to support plural form sheets against said platen, a front feed frame operatively connected to said platen to assume an open and a closed paper feeding position relative thereto, *indicator* means on said front feed frame to indicate marginal positions for [particular] *different types of* sheets inserted in said front feed frame, *indicia on said front feed frame for designating the respective indicator means,* a multiple control stop bar on said carriage adapted to be selectively set relative thereto, and [means] *indicia corresponding with the indicia of said front feed frame indicator means* for indexing the rotary position of said multiple control bar [to correspond with the marginal position on said front feed frame indicator means].

[5. In a device of the character described, the combination with a frame, of a carriage movably mounted on said frame, a platen journaled in said carriage, a paper sheet feeding member pivotally mounted on said carriage relative to said platen, a plurality of operating levers for actuation to control the operating characteristics of the instrumentalities on said carriage, and a multiple control bar journaled on said carriage to receive stops thereon, manual means on said control bar to regulate the rotary position thereof for controlling the operating characteristics of the instrumentalities on said carriage, and means on said carriage to cooperate with said control bar to index the rotary position thereof commensurate with the faces on said control bar.]

[6. In a device of the character described, the combination with a frame, of means on said frame to control the operating characteristics of typing and posting instrumentalities, a marginal and column stop indicator on said carriage, a multiple control bar journaled for rotary adjustment on said frame, a plurality of stops adjustably associated with said frame to present a plurality of faces in the path of said control bar, and means for indexing the rotary position of said control bar to correspond with said marginal column stop indicator.]

[7. In a device of the character described, the combination with a base frame having imprinting instrumentalities therein, of a carriage on said base frame, a paper feed frame on said carriage, means on said base frame for controlling the operating characteristics of said imprinting instrumentalities, a marginal stop indicator on said paper feed frame, a plurality of paper guides adjustably associated with said paper feed frame to cooperate with said marginal stop indicator for determining the setting of said paper guides, a control bar on said carriage, and stops positioned on said control bar to correspond with the marginal stops on said indicator to limit the displacement of said carriage on said base frame.]

8. In a device of the character described, the combination with a base frame having imprinting instrumentalities therein, of a carriage on said base frame, a paper feed frame on said carriage, means on said base frame for controlling the operating characteristics of said imprinting instrumentalities, a marginal [stop] indicator on said paper feed frame, a plurality of paper guides adjustably associated with said paper feed frame to cooperate with said marginal [stop] indicator for determining [the setting] *different settings* of said paper guides, a *rotatable* cylindrical control bar on said carriage *adjustable to different indexed positions corresponding to said different settings of said paper guides*, and stops threadedly positioned on said control bar [to correspond with the marginal stops on said indicator] to *variably* limit the displacement of said carriage on said base frame *in the different indexed positions of said control bar*.

[9. In a device of the character described, the combination with a base frame having imprinting instrumentalities therein, of a carriage on said base frame, a paper feed frame on said carriage, means on said base frame for controlling the operating characteristics of said imprinting instrumentalities, a marginal stop indicator on said paper feed frame, a plurality of paper guides adjustably associated with said paper feed frame to cooperate with said marginal stop indicator for determining the setting of said paper guides, a control bar on said carriage, a plurality of polygonal mounts threadedly associated with said control bar for positioning therealong, and stops positioned on said control bar mounts on each of the polygonal sides thereof to correspond with the marginal stops on said indicator to limit the displacement of said carriage on said base frame.]

[10. In a device of the character described, the combination with a base frame having imprinting instrumentalities therein, of a carriage on said base frame, a paper feed frame on said carriage, means on said base frame for controlling the operating characteristics on said imprinting instrumentalities, a marginal stop indicator on said paper feed frame, a plurality of paper guides adjustably associated with said paper feed frame to cooperate with said marginal stop indicator for determining the setting of said paper guides, a control bar on said carriage, a plurality of polygonal mounts threadedly associated with said control bar for positioning therealong, stops positioned on said control bar mounts on each of the polygonal sides thereof to correspond with the marginal stops on said indicator to limit the displacement of said carriage on said base frame, and means for indexing the rotary position of said control bar to correspond with the polygonal sides of said stop mounts thereon.]

11. A marginal and column stop control bar for imprinting machines comprising a cylindrical bar threaded for substantially the effective length thereof, polygonal stop mounts threadedly associated with said control bar, means for securing said polygonal mounts in threadedly adjusted positions on said control bar, a plurality of plates detachably associated with said mounts and stops projecting from the edges of said plates in a variety of different positions thereon.

12. A marginal and column stop control bar for imprinting machines comprising a cylindrical bar threaded for substantially the effective length thereof, spring impact compensating means on said cylindrical bar, polygonal stop mounts threadedly associated with said control bar, means for securing said polygonal mounts in threadedly adjusted positions on said control bar, a plurality of plates detachably associated with said mounts and stops projecting from the edges of said plates in a variety of different positions thereon.

13. A marginal and column stop control bar for imprinting machines comprising a cylindrical bar threaded for substantially the effective length thereof, polygonal stop mounts threadedly associated with said control bar, rotary position indexing means on said control bar corresponding to the sides on said polygonal stop mounts, means for securing said polygonal mounts in threadedly adjusted positions on said control bar, a plurality of plates detachably associated with said mounts and stops projecting from the edges of said plates in a variety of different positions thereon.

14. A marginal and column stop control bar for imprinting machines comprising a cylindrical bar threaded for substantially the effective length thereof, spring impact compensating means on said cylindrical bar, polygonal stop mounts threadedly associated with said control bar, rotary position indexing means on said control bar corresponding to the sides on said polygonal stop mounts, means for securing said polygonal mounts in threadedly adjusted positions on said control bar, a plurality of plates detachable associated with said mounts and stops projecting from the edges of said plates in a variety of different positions thereon.

15. A marginal and column stop control bar for imprinting machines comprising a cylindrical bar threaded for substantially the effective length thereof, polygonal stop mounts threadedly associated with said control bar, there being a linear groove on said control bar for the threaded extent thereof, set screw means cooperating with said linear control bar groove for securing said polygonal mounts in threadedly adjusted positions on said control bar, a plurality of plates detachably associated with said mounts and stops projecting from the edges of said plates in a variety of different positions thereon.

*16. In a device of the character described, the combination with a frame, of a carriage on said frame, a platen carried by said carriage, feed rollers cooperating with said platen to support plural form sheets against said platen, a front feed frame operatively connected to said platen to assume an open and a closed paper feeding*

*position relative thereto, separate designated groups of indications on said front feed frame for designating marginal positions on said front feed frame for certain form sheets with which the machine is adapted to operate, and a multiple control stop bar adjustably mounted on said carriage and adapted selectively to be set relative thereto, said stop bar having a designation corresponding with the designation of each of said designated groups of indications for determining the setting of said stop bar for the particular sheet on which the machine is to operate.*

*17. In a device of the character described, the combination with a frame, of a carriage on said frame, a platen carried by said carriage, feed rollers cooperating with said platen to support plural form sheets against said platen, a front feed frame operatively connected to said platen to assume an open and a closed paper feeding position relative thereto, indicator means on said front feed frame having separate groups of indications for setting forth marginal positions on said front feed frame for certain form sheets with which the machine is adapted to be used and a designation for each group of indications, a multiple control stop bar adjustably mounted on said carriage for selective positioning with respect thereto and designations on said stop bar for determining the setting thereof in conformance with the designations on said indicator means for particular form sheets with which the machine is to be used.*

*18. In a device of the character described, the combination with a base frame, of a carriage on said frame, a paper feed frame on said carriage, means on said base frame for controlling the*

*operating characteristics of imprinting instrumentalities, a control bar adjustably mounted on said carriage for movement to any one of a plurality of positions for exposing separate groups of stops thereon for operative engagement with the means on said frame that control the operating characteristics of imprinting instrumentalities, designations on said control bar for setting forth which group of stops are in operative position, separate groups of indications on said paper feed frame for setting forth marginal positions for particular form sheets for the use of which the groups of stops on the control bar may be set, and a designation for each group of indications adapted to correspond with a designation on the control bar when the group of marginal indications is for the same form sheet for which the control bar is adjusted.*

References Cited in the file of this patent or the original patent

UNITED STATES PATENTS

| Number | Name | Date |
|---|---|---|
| 940,395 | Labofish | Nov. 16, 1909 |
| 1,058,547 | Campbell | Apr. 8, 1913 |
| 1,158,608 | White | Nov. 2, 1915 |
| 1,209,090 | Wernery | Dec. 19, 1916 |
| 1,320,593 | Wherry | Nov. 4, 1919 |
| 1,938,531 | Ostrey | Dec. 5, 1933 |
| 1,946,572 | Crosman | Feb. 13, 1934 |
| 1,994,647 | Helmond | Mar. 19, 1935 |
| 2,081,423 | Crosman | May 25, 1937 |
| 2,160,254 | Smith | May 30, 1939 |
| 2,185,424 | Anderson | Jan. 2, 1940 |
| 2,387,068 | Hegnauer | Oct. 16, 1945 |